United States Patent
Kotrappa et al.

(10) Patent No.: US 7,312,439 B1
(45) Date of Patent: Dec. 25, 2007

(54) RADON PROGENY MONITOR

(75) Inventors: Payasada Kotrappa, Frederick, MD (US); Lorin R. Stieff, Kensington, MD (US); John C. Dempsey, Frederick, MD (US)

(73) Assignee: Rad Elec Inc., Frederick, MD (US)

( * ) Notice: Subject to any disclaimer, the term of this patent is extended or adjusted under 35 U.S.C. 154(b) by 237 days.

(21) Appl. No.: 10/919,526

(22) Filed: Aug. 17, 2004

Related U.S. Application Data (60) Provisional application No. 60/495,700, filed on Aug. 18, 2003.

(51) Int. Cl.
*G01V 5/00* (2006.01)

(52) U.S. Cl. .................. 250/255; 250/DIG. 2

(58) Field of Classification Search ............... 250/255, 250/DIG. 2
See application file for complete search history.

(56) References Cited

U.S. PATENT DOCUMENTS

| | | | |
|---|---|---|---|
| 4,385,236 A | | 5/1983 | Hassib et al. |
| 4,518,860 A | | 5/1985 | Alter et al. |
| 4,800,272 A | * | 1/1989 | Harley et al. ............... 250/253 |
| 4,847,503 A | | 7/1989 | Tetley et al. |
| 4,853,536 A | * | 8/1989 | Dempsey et al. ........... 250/253 |
| 4,861,985 A | | 8/1989 | Pai |
| 4,920,263 A | | 4/1990 | Fimian et al. |
| 4,926,053 A | | 5/1990 | Dempsey et al. |
| 4,963,730 A | | 10/1990 | Tetley et al. |
| 4,975,575 A | * | 12/1990 | Perlman ..................... 250/255 |
| 4,992,658 A | | 2/1991 | Ramsey, Jr. et al. |
| 5,008,540 A | * | 4/1991 | Dempsey ................. 250/336.1 |
| 5,026,986 A | | 6/1991 | Hurst |
| 5,026,989 A | * | 6/1991 | Merkel ..................... 250/338.1 |
| 5,055,674 A | * | 10/1991 | Kotrappa .................... 250/255 |
| 5,068,538 A | * | 11/1991 | Harley ..................... 250/472.1 |

(Continued)

OTHER PUBLICATIONS

Voltmeter, The Columbia Encyclopedia 2006, Columbia University Press, 6th Edition.*
Evans, Robley D.; *Engineers' Guide to the Elementary Behavior of Radon Daughters*; Health Physics, vol. 17; Pergamon Press; 1969; pp. 229-252.

(Continued)

*Primary Examiner*—David Porta
*Assistant Examiner*—David S Baker
(74) *Attorney, Agent, or Firm*—James Creighton Wray; Clifford D. Hyra (57) ABSTRACT

A new type of radon progeny monitor called an electret radon progeny integrating sampling unit (E-RPISU) using an electret ion chamber to measure radon progeny concentration. A conventional 1 LPM particulate air sampling system is used to collect the radon progeny on a roughly 3.5 $cm^2$ filter that is mounted on a side of an electret ion chamber such that the collected progeny are exposed to the inside of the chamber. Alpha radiation emitted by the progeny collected on the filter ionizes the air in the approximately 220 ml chamber. Ions of opposite polarity collect on the surface of the electret of suitable thickness and reduce its surface voltage. A specially built surface voltmeter is used to measure the electret voltage before and after sampling. The electret voltage drop that occurs during the sampling period is proportional to the time integrated progeny concentration. A similar unit with a screen in the place of filter is used to measure unattached progeny concentration. Another similar unit without filter is used to provide background response to compute net progeny concentration and also to compute radon concentration.

43 Claims, 3 Drawing Sheets

U.S. PATENT DOCUMENTS

| | | | |
|---|---|---|---|
| 5,128,540 | A | 7/1992 | Stieff |
| 5,134,297 | A * | 7/1992 | Harley et al. ............ 250/472.1 |
| 5,204,528 | A * | 4/1993 | Hurst et al. ................. 250/255 |
| 5,225,673 | A | 7/1993 | Pressianov et al. |
| 5,319,208 | A | 6/1994 | Diamondis |
| 6,018,985 | A | 2/2000 | Lane-Smith |
| 6,228,400 | B1 | 5/2001 | Lee et al. |
| 6,288,400 | B1 * | 9/2001 | Negro ....................... 250/380 |
| 2002/0014596 | A1 | 2/2002 | Harley et al. |

OTHER PUBLICATIONS

Kotrappa et al.; *A Practical E-PERM (Electret Passive Environmental Radon Monitor)*; Health Physics, vol. 58, No. 4; Pergamon Press; Apr. 1990; pp. 461-467.

Kotrappa et al.; *Measurement of Potential Alpha Energy Concentration of Radon and Thoron Daughters Using an Electret Dosemeter*; Radiation Protection Dosimetry, vol., No. 1; Nuclear Technology Publishing; 1983; pp. 49-56.

Kotrappa et al.; *An Electret Passive Environmental $^{222}RN$ Monitor Based on Ionization Measurement*; Health Physics, vol. 54, No. 1: Health Physics Society, Jan. 1988; pp. 47-56.

Kotrappa et al.; *An E-RPISU (Electret Radon Progeny Integrating Sampling Unit) A New Instrument for Measurement of Radon Progeny Concentration in Air*; Proceedings of the 1990 International Symposium on Radon and Radon Reduction Technology, vol. 58, No. 4; Apr. 1990; pp. 461-467.

* cited by examiner

RADON PROGENY MONITOR

This application claims the benefit of priority under 35 U.S.C. 119(e) of U.S. provisional application 60/495,700 filed on 18 Aug. 2003.

BACKGROUND OF THE INVENTION

During exposure to radon, the radiation dose in the lungs is almost entirely due to the inhalation of particulate radon daughter products. These daughter products deposit in the airways of the lungs and irradiate the basal cells of tracheobronchial and pulmonary epithelia. These cells receive doses not only from the deposited progeny but also from the alpha radiation emitted by the radon daughter products formed after deposition.

This knowledge led to the concept of relating radiation inhalation hazards to the ultimate or potential alpha energy concentrations in working level units (WL). One WL is defined as the potential alpha energy concentration from the decay products of radon equivalent to 135,000 MeV per liter of air. It has been shown that one WL also corresponds to 16,844 alpha from radon progeny contained in one liter of air. An RPISU (radon progeny integrating sampling unit) is a generic name given to instruments that collect radon progeny on filter paper and register the alpha radiation from the deposited progeny during an entire period of collection. An RPISU is an instrument designed to measure radon progeny concentration in WL units. Alpha radiation is registered not only during the entire period of collection, but also three hours after cessation of sampling. This data, along with the volume of the sample collected, is converted into a progeny concentration in WL units. RPISU units have been reported that use thermoluminiscent dosimeters, alpha track detectors, and solid-state detectors.

The sensitivities of current systems are restricted by the fact that (1) the detectors are small and must be located close to the filter, within the range of alpha radiation, and (2) the area of filter paper is limited by the size of the detectors.

Previous methods of measuring radon progeny are costly, cumbersome and require large measurement times. Currently, only highly expensive radon progeny monitors are available to measure radon progeny concentrations. In addition, these techniques require a skilled operator to extract meaningful measurements. These involve standard electronic components, which are subjected to effects of temperature, humidity and susceptibility to shocks.

United States Environmental Protection Agency has stipulated that a measurement has to be done for a minimum of two days. Because of diurnal variations, only such measurements are considered as valid measurement for homes.

There are needs for researchers to be able to measure radiation over shorter or longer than two-day periods with simple and efficient devices.

SUMMARY OF THE INVENTION

The present invention is a new type of radon progeny monitor called an electret radon progeny integrating sampling unit (E-RPISU). This monitor uses an electret ion chamber to measure radon progeny concentration. A conventional 1 liter per minute particulate air sampling system is used to collect the radon progeny on an approximately 3.5 $cm^2$ filter that is mounted on a side of an electret ion chamber such that the collected progeny are exposed to the inside of the chamber.

Alpha radiation emitted by the radon progeny collected on the filter ionizes the air in an approximately 220-ml chamber. Ions of opposite polarity collect on the surface of the electret of suitable thickness, usually about 0.127 or 1.524 mm, and reduce its surface voltage. A specially built surface voltmeter is used to measure the electret voltage before and after sampling. The electret voltage drop that occurs during the sampling period is proportional to the time integrated progeny concentration.

An electret is a piece of dielectric material carrying a permanent electrical charge. Its effective surface charge decreases only by the collection of ions in the ambient air. An electret ion chamber is an electrically conducting plastic chamber containing a charged electret located at the bottom of the chamber. Electret ion chambers are used as a passive environmental radon monitor. The E-RPISU of the present invention uses an electret ion chamber configuration to register the ions produced from the alpha radiation emitted by radon progeny that are collected on the filter paper.

The restrictions of currently existing radon monitors do not apply to the present invention. The filter area is large, allowing a low cost, low flow rate pump to be used without concern about pressure drops. The electret detector does not need to be in the immediate vicinity of the filter. Also, the chamber size can be relatively large. Electret ion chamber configuration used in the progeny monitor does not have any electronic components and as such these are not subjected to effects from mechanical shocks, varying temperatures and humidities.

The E-RPISU of the present invention is a variation on conventional RPISU monitors. An electret is located in an electret ion chamber serving as a sensor for registering the ions created by emitted alpha radiation. A conventional low flow rate air-sampling pump is used to collect the progeny on a filter mounted on the side of the electret ion chamber, such that the collected progeny ionizes the air inside the chamber. The sampling head can be loaded either with a filter paper or with a screen. The E-RPISU with filter collects total radon progeny and the E-RPISU with screen collects the unattached radon progeny. The collected progeny decay and emit alpha particles that pass through a membrane, preferably Aluminized Mylar, and into the main electret chamber. When such units are used together, the data can be used for calculating unattached fractions that are an important parameter in assessing radon risk.

The negative ions that are produced are collected by a positively charged electret, usually about 0.127 or 1.524 mm thick, causing the electret voltage to drop. The electric voltage drop that occurs during the sampling period is proportional to the time integrated progeny concentration. The calibration factor for E-RPISU ranges from about 1.2 to about 1.6 V per mWL-day when sampled at roughly 1 liter per minute using a roughly 0.127 mm thick electret. If higher sensitivity is needed, an electret of about 1.524-mm thickness is used. The current device has the sensitivity needed for indoor radon progeny measurements.

The present invention allows for determining radon progeny concentrations in a variety of atmospheric conditions during a short and long period of sampling. The key development for the application of the present device is the creation of very stable electrets that allow for the long duration integration required for indoor monitoring.

Another electret ion chamber without sampling head is used side by side for calculating radon concentration over the same period of sampling. This also provides background to be subtracted from E-RPISU to calculate net progeny concentration. The radon, the progeny and the unattached progeny are measured separately, allowing one to calculate all the parameters necessary for total characterization of radon, namely, radon concentration, radon progeny concentration, equilibrium ratio and the unattached fraction.

A similar unit with a screen in the place of filter is used to measure unattached progeny concentration. Another similar unit without filter is used to provide background response to compute net progeny concentration and also to compute radon concentration. This advanced radon characterization instrument provides with three components in one instrument proving, radon progeny concentration, unattached progeny fraction, radon concentration and equilibrium ratio. These parameters are important in assessing inhalation risk from inhaling radon and radon progeny.

These and further and other objects and features of the invention are apparent in the disclosure, which includes the above and ongoing written specification, with the claims and the drawings.

DETAILED DESCRIPTION OF THE PREFERRED EMBODIMENTS

The present invention is a new type of radon progeny monitor called an electret radon progeny integrating sampling unit (E-RPISU) that uses an electret ion chamber to measure radon progeny concentration. A conventional 1 liter per minute particulate air sampling system is used to collect radon progeny on an approximately 3.5 $cm^2$ filter mounted on a side of an electret ion chamber such that the collected progeny are exposed to the inside of the chamber.

A similar unit with a screen in the place of filter is used to measure unattached progeny concentration. Another similar unit without filter is used to provide background response to compute net progeny concentration and also to compute radon concentration. This advanced radon characterization instrument provides with three components in one instrument proving, radon progeny concentration, unattached progeny fraction, radon concentration and equilibrium ratio. These parameters are important in assessing inhalation risk from inhaling radon and radon progeny.

Figure 1:
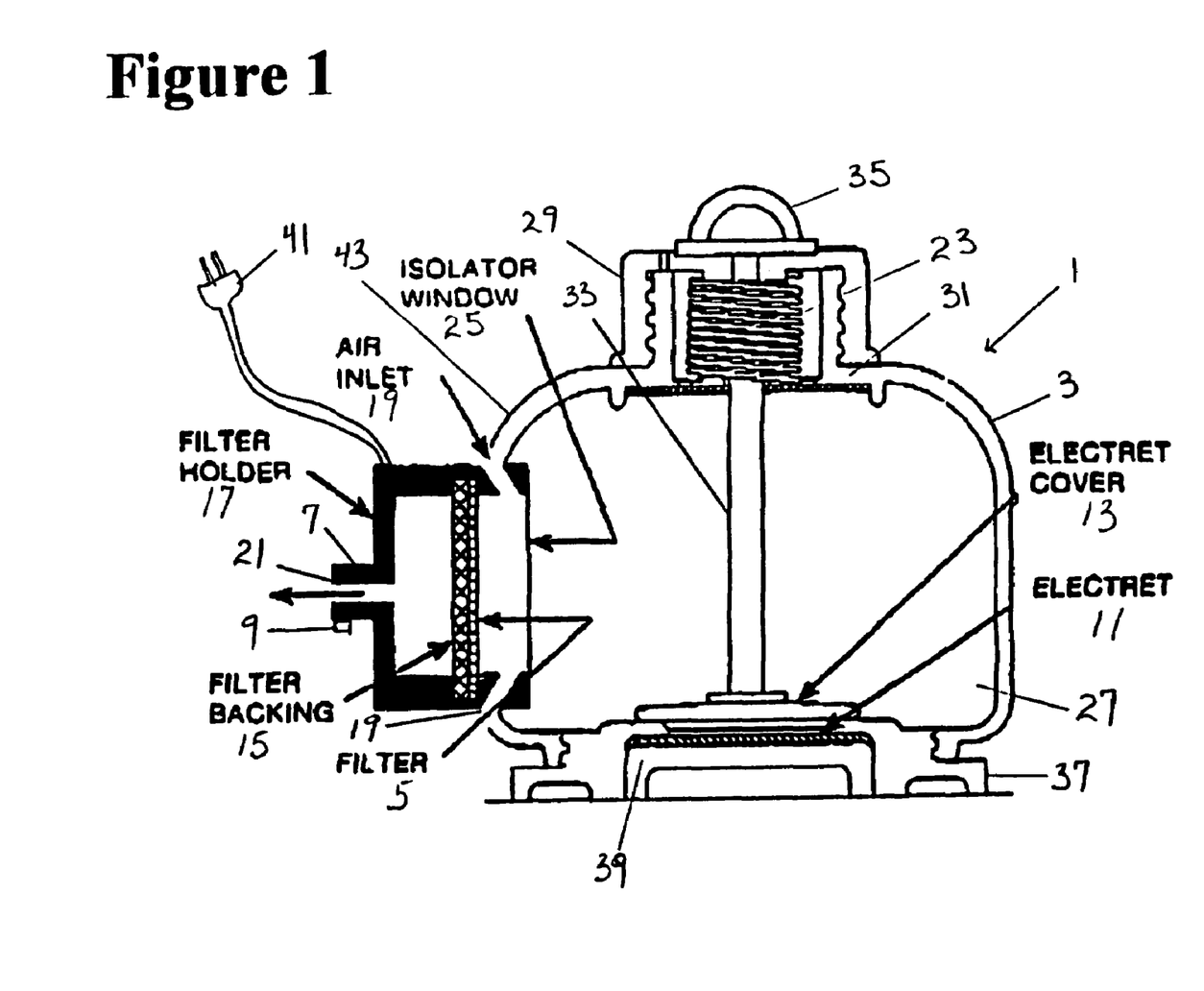
FIG. 1 is a diagram of a closed E-RIPSU monitor.

FIG. 1 shows the design features of an E-RPISU radon progeny monitor 1. The current monitor 1 generally consists of a special electret ion chamber 3 with an associated air-sampling filter 5, an air-sampling pump 7, a calibrated air flow meter 9, an electret 11 and an electret cover 13.

The air-sampling filter 5 is contained within the monitor 1 with an appropriate filter holder 17. The filter 5 is held in position by a filter backing 15 between one or more air inlets 19 and the pump 7 and calibrated a flowmeter 9. The filter 5 collects radon progeny. An alternate to the flowmeter is to use a critical orifice. A standard one-inch filter holder 7 is fitted to the side of the standard electret ion chamber 3. Six small openings 19, approximately 2 mm in diameter, are provided for environmental air entry. The pump 9 moves air in through the air inlets 19. The air then passes through the filter 5, filter-backing 15 and out an air outlet 21. A calibrated flow meter 9 measures the quantity of air that passes through the monitor 1.

The electret 11 is also contained within the electret ion chamber 3. A spring-loaded 23 electret cover 13 is used to cover the electret 11 when the E-RPISU monitor 1 is either in storage or transit. A thin film 25, preferably Aluminized Mylar, separates the interior 27 of the chamber 3 from the environmental air. The thin film 25 allows alpha particles to pass through but prevents air passage.

Structural features include a cap 29 that covers the top 31 of the electret ion chamber 3. The cap 29 is connected to a rod 33 that runs between the cap 29 and the electret cover 13. A handle 35 is attached to the top of the cap 29 and a base 37 is attached to the base 39 of the chamber 3 for setting the chamber on a floor, table or other surface.

The monitor 1 of the present invention is assembled in a customized carrying case for ease of use. The unit operates on a 110 V 60 Hz household power supply. However, in localities where household supply is 220 V 50 HZ or another standard, the unit can be used with appropriate step down transformer. This may or may not require continuous correction for a time totalizer. The same protocols applicable to other types of radon progeny integrating sampling units are applicable to the present invention as well.

To operate the monitor 1 of the present invention, an electret 11 is measured and loaded into the E-RPISU chamber 3. A fresh filter 5 is fitted into an air-sampling holder 17. Then, the sampling pump 7 is run for a known period of time, from hours to days. The electret 11 is then measured about three hours after the pump 7 has stopped. If measurement has to be made immediately after the end of the sampling, theoretical correction is provided. The data needed for the computation of the radon progeny concentration are: (1) initial and final readings of the electret 11, (2) the airflow rate, and (3) the period of sampling.

To operate the radon progeny monitor 1 of the present invention, the electret 11 is left in the chamber 3 at all times. FIG. 1 shows the monitor 1 in a closed position for when the monitor 1 is not in use. The cap is screwed down on the top 31 of the chamber 3 so that electret 11 remains covered. This condition is referred to as E-RPISU chamber closed position.

The initial and final readings from surface of the electret 11 are measured using an electret surface potential voltmeter fitted into the void shown in the bottom of the base 39 of the chamber 3. The voltmeter is placed at a location where the measurement is to be taken. An initial reading of the electret 11 is taken in J volts. This can be done either in the field or in the laboratory.

Figure 2:
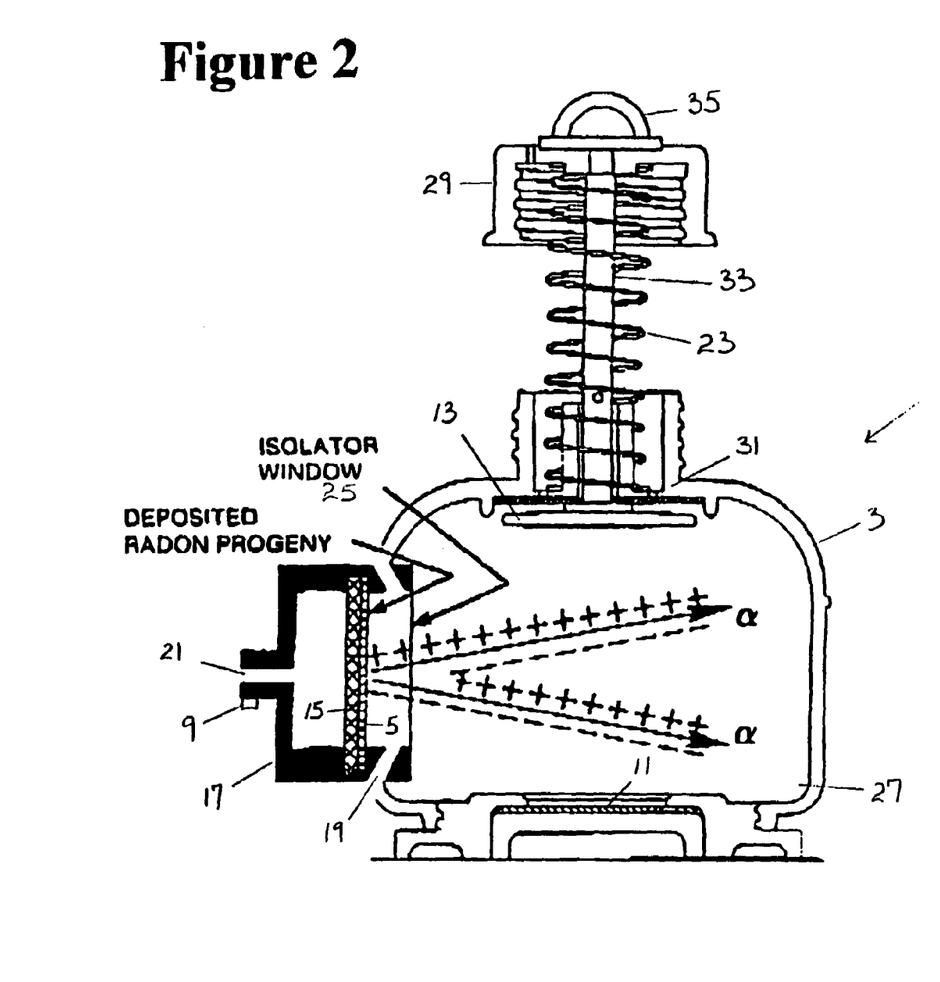
FIG. 2 is a diagram of an open E-RIPSU monitor.

Just before taking a sample, the chamber screw cap 29 is unscrewed to bring the E-RPISU to the open position, as shown in FIG. 2. Then, a power point 41 is plugged into a household power supply. The unit 1 is switched to the on position and the starting time and flow rates are recorded. The monitor 1 is then run for at least one day.

The air sampling pump 7, operating at anywhere from about 0.5 to about 2.0 liters per minute, is used to collect radon progeny for a measured sampling time on an approximately 3.5 $cm^2$ filter sampler 5, which is mounted on a side 43 of the electret ion chamber 3. The flow rate is adjusted to a desired flow rate. A recommended flow rate is about 1 liter per minute with a sampling period of approximately 1 to 7 days.

The filter 5 is mounted to ensure the collected radon progeny emit radiation toward the interior of the chamber 3. The alpha radiation emitted by the collected progeny on the filter 5 and ionizes the air in the electret ion chamber 3. The chamber 3 has a volume of approximately 220 ml. The monitor 1 of the present invention measures ions created by alpha radiation. Radon progeny are collected on the filter 5 and unattached radon progeny are collected on the screen 15, when filter is not loaded. The collected total radon progeny on the filter and unattached daughter progeny decay and emit alpha particles that pass through the isolator window 25. Ions of opposite polarity are collected on the approximately, usually about 0.127 or 1.524 mm, thick electret 11 and reduce its surface voltage. The ions are continuously collected by the electret, providing integrated alpha activity collected on the filter paper. The electret voltage drop that occurs during the sampling period is proportional to the time integrated progeny concentration. A standard SPER-1 reader can be used to measure the E-RPISU electret 11 before and after the sampling.

When the desired period of sampling is complete, the power is turned off and the chamber 3 is brought to a closed position by screwing the cap 29 onto the top 31 of the chamber 3. The final airflow rate, time and date are noted and the pump 7 is stopped. The final surface voltage of the electret 11 is measured. The measurement can be done either at the place of measurement or after taking the device to the laboratory. The data to be noted are: (1) initial electret voltage, (2) final electret voltage, (3) air sampling duration, and (4) the average flow rate. The initial and final voltages of the electret in the radon monitor are also measured. Specially prepared software can be used for rapid calculation.

The monitors of the present invention have sufficient sensitivity to provide results with better than 10% precision at 0.01 WL for a 2 day measurement when used with LTk electrets. These provide better than 10% precision at 0.001 WL, when used with ST Electrets.

Use I, F, D and L in the following equation to calculate the progeny concentration in mWL units.

$$RP = \frac{(I - F + Q)}{(D \times C \times L)} \quad (1)$$

$$Q = \frac{(I - F) \times 0.03}{D} \quad (2)$$

$$C = A + B \times \frac{(I + F)}{2} \quad (3)$$

Where,
RP is the radon progeny concentration in mWL
I and F are the initial and final voltage of LT electret
D is the sampling time in day units
L is the flow rate in liters per minute
Q is the tail end correction
C is the calibration factor
A and B are also called as calibration constants, which depend upon the type of electrets used.

EXAMPLE 1

$$RP = \frac{(I - F + Q)}{(D \times C \times L)}$$

Where:
RP=the progeny concentration in mWL
I and F=the initial and final voltages of the electret
D=the sampling time in units of days
L=the flow rate in liter per minute Q is a correction factor given by:

$$Q = \frac{(I - F) \times 0.03}{D}$$

C is a calibration factor given by:

$$C = 0.6994 + 0.0006139 \times \frac{(I + F)}{2}$$

The following is a worked out example of the calculation process:
Sampling time: 1 day and 16 hours D=1.6667 days
Flow rate: 1 liter per minute L=1.00
Initial electret volts: 700 V I=700
Final electret voltage: 600 V F=600
Therefore, assuming that C=1.09844 and Q=1.8, the resulting progeny concentration is 55.6 mWL.

EXAMPLE 2

$$RP = \frac{(I - F)}{(D \times C \times L)}$$

Where:
RP=the progeny concentration in mWL
I and F=the initial and final voltages of the electret
D=the sampling time in units of days
L=the flow rate in liter per minute
C is a calibration factor given by:

$$C = 11.9158 + 0.002236 \times \frac{(I + F)}{2}$$

The following is a worked out example of the calculation process:
Sampling time: 30 minutes D=0.020833 days
Flow rate: 10 liters per minute L=10.0
Initial electret volts: 700 V I=700
Final electret voltage: 600 V F 600
Therefore, assuming that C=13.3692, the resulting progeny concentration is 35.9 mWL.

The present invention replaces the costly and complex technique of sampling air on a filter paper and programmed counting of the paper in an alpha scintillation counter in order to obtain radon progeny concentrations. The present invention is much simpler and less costly compared to existing methods. Results are generally within about 10% of standardized chamber values.

It is important to have a correct flow rate. The flow meter may need periodic calibration, at least once a year. Filter paper should be changed after 7 days of sampling. The Al Mylar window in front of the filter isolates the electret ion chamber from the environmental air. This is located inside the chamber and should not be touched at any time.

The units can be operated with top cover open.

Normally progeny monitor responds to radon progeny, radon and gamma radiation background.

Additional identical units without progeny sampling heads are used side by side. These units respond to radon and gamma radiation background. The measured progeny equivalent of these units is subtracted to calculate the net radon progeny concentration. This correction is considered small, but under special situations, such as low equilibrium ratios, this can be significant.

The response from this additional unit is also used to calculate radon concentration using standard procedures for measuring radon concentration using electret ion chambers. This radon concentration is used in conjunction with radon progeny concentration to calculate equilibrium ratio.

Three different units are assembled into one composite unit: a progeny monitor with filter, a progeny monitor with screen, and a radon monitor.

Radon progeny monitor get signals from radon and gamma radiation. It is suggested that an appropriate gamma radiation monitor be operated for the identical duration and conditions as the present invention. An appropriate equation for calculating gamma radiation concentration is used. This value is subtracted from the progeny concentration calculated from the present invention to get the net concentration of radon.

Once the progeny concentration and radon concentrations are known, equilibrium ratios can be calculated using standard procedures.

One of the methods of measuring unattached decay products of radon is to sample air through a wire mesh. Two E-RPISU units can be run together, one with the filter and the other with the mesh. Radon progeny concentration is calculated on both using the same procedure. The ratio of the result from the mesh and the filter gives the unattached fraction.

The collection efficiency of wire screens for RaA, first daughter of radon, can be theoretically calculated by the equation cited by Raghavayya and Jones (Health Physics: 26:(417-429), 1974), attributed to Hinchcliffe.

Fractional penetration P is given by the following equations:

$$P=0.82e^{-0.233h}+0.18e^{-16.7h}$$

$$E=100(1-p)$$

$$h=100\frac{M^2dD}{V}$$

Where

E is the collection efficiency in %

M is the mesh size in mesh/cm d wire diameter in cm

D is the diffusion coefficient of RaA (assumed to be 0.06 $cm^2/cm$)

V is the linear velocity in cm/sec

The parameters of mesh used in E-RPISU unattached radon progeny monitors gives approximately 94% collection efficiency, when sampled at about 1 liter per minute.

The monitor of the present invention has improved accuracy over past devices. The monitor has sufficient sensitivity to provide results with better than 10% precision at 0.01 WL for a 2 day measurement when used with LT electrets. This provide better than 10% precision at 0.001 WL, when used with ST Electrets. The sampling rate or duration of sampling can be readily varied, if desired.

The calculations are simple and can be programmed into a spreadsheet. The voltage data, along with other parameters, are used in the above equations to provide the average radon progeny concentration in working level units.

The E-RPISU unit 1 is calibrated in a standard chamber where the radon progeny concentration is precisely known. Most of the work is carried out in a well-calibrated QC chamber. For testing purposes, a set of three E-RPISU units were used, all of them with a starting initial electret voltage of about 750 V. The three units were run for a period of one day with a flow rate of 1 liter per minute at a progeny concentration of about 0.075 WL or 75 mWL. The final voltages of electrets 11 were recorded after allowing the registration of ions for an additional period of three hours after cessation of the sampling. Experiments were continued for several days until the final voltages of the electrets 11 dropped to about 150 V. The calibration factors were determined using the following equation:

$$C=(IV-FV)/(CF \times F \times D) \qquad (4)$$

Where:

PC is the progeny concentration in mWL

IV is the initial voltage of the electret

FV is the final voltage of the electret

F is the flow rate in liters per minute

D is the duration of sampling in units of days

CF is the calibration factor

Figure 3:
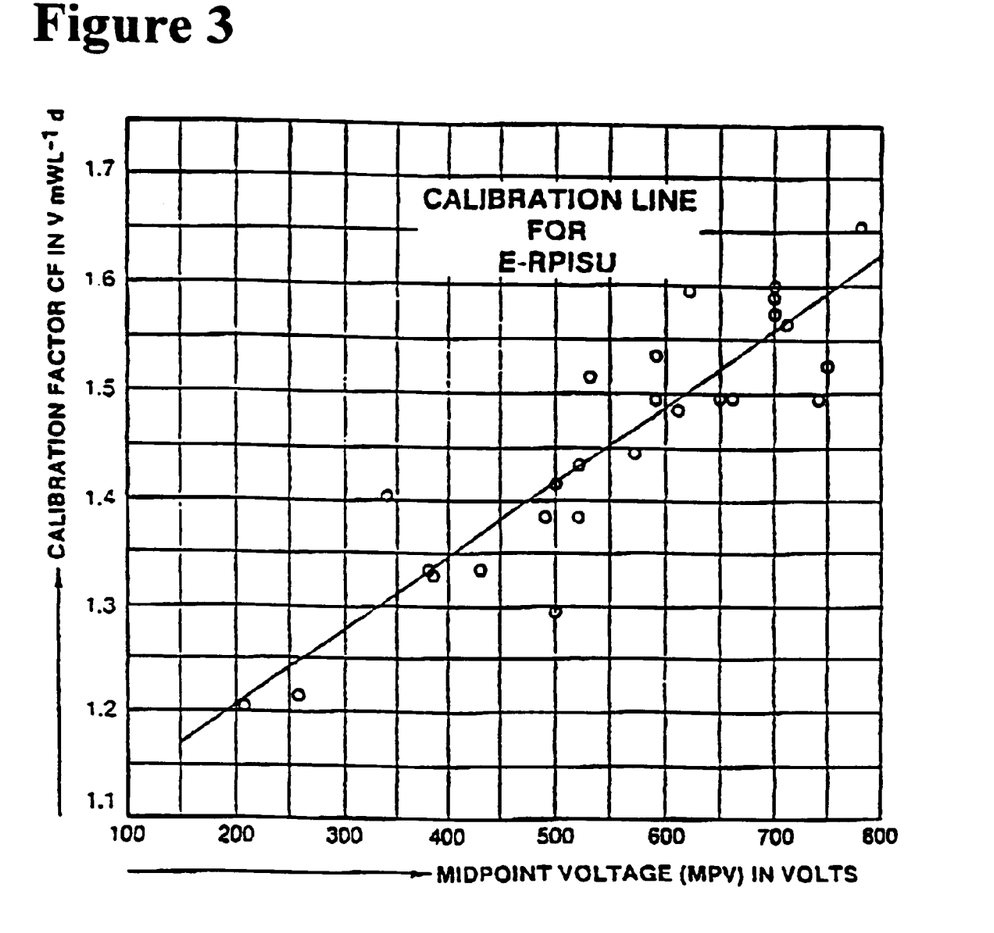
FIG. 3 is a graph of a calibration curve for an E-RIPSU monitor.

FIG. 3 shows such a calibration curve. The calibration factor is on the vertical axis and the average of the initial and final voltages of each measurement, also called the midpoint voltage or MPV, is on the horizontal axis. Equation (5) is a linear regression equation relating the CF and MPV. The correlation coefficient is 0.89.

$$CF=1.0744+0.000685 \times (MPV) \qquad (5)$$

These constants can be different depending upon the type of electrets used, and membrane used.

In practice it is not always convenient or possible to wait an additional three hours after the cessation of the sampling for the registration of the alpha radiation of the tail end. It is possible to apply a correction for this part, if waiting additional three hours is not practical. If DV is the voltage drop over a sampling period of DT days, then the average rate of change of voltage is DV/DT, which can be taken as constant and is an acceptable approximation for the end of sampling. With this constant approximation the total expected tail-end voltage drop (TD) during the tail-end portion is given by equation (6).

$$TD=(DV)/(DT) \times \text{Integration from zero to infinity of} \\ (\exp(-Xt))dt=(DV)/(DT) \times 0.03 \qquad (6)$$

Where X is the decay constant for the deposited radon progeny is about 33.3 per day. This value is determined by assuming the half-life of the deposited progeny as about a half-hour or 0.0208 days.

Therefore, the total corrected voltage drop (CDV) is given equation (7).

$$CDV=DV+(DV)/(DT) \times 0.03 \qquad (7)$$

Let us assume the following values for a typical measurement:

IV=700 V; FV=650 V; DT=1.25 days; F=1.00 liters per minute.

Calculated parameters are:

MPV=675 V; CF=1.537; DV=50 V; CDV=51.2 V.

The result is:

$$PC=51.2/(1.537 \times 1.25 \times 100)=26.6 \text{ mWL}=0.0266 \text{ WL}$$

The average radon progeny concentration is 0.0266 WL.

Note that FV is the final voltage measured without waiting for the registration of tail-end ionization.

The performance of the present radon progeny monitor has been evaluated at different progeny concentrations, different humidities and different condensation nuclei counts. The monitor measurements do not exceeded 12% off from the chamber value. Table 1 shows results of testing. The absolute value of relative errors is in the range of about 5%, much better than the EPA requirement of 25%. Other study results are also shown in Table 2. As can be seen, the absolute values of these relative errors are in the range of about 2% to 3%.

There are two sources of possible error in the current monitor. One is random error associated with dimensional variation, flow rate variation and other system errors. As seen from the performance testing, in Table 1, this error is small and can be taken as about 5%. This figure was confirmed by running a large number of units in the same location.

Another error is the measurement of surface voltages. The measurement can be done only to within an accuracy of 1 V. When a difference between the two measurements is taken, as is always the case, the expected error is 1.42 V or the square root of 2. This error can be substantial if the total measured voltage difference is small. For example, a sample is taken for one day at a concentration of 5 mWL at a flow rate of 1 liter per minute. The expected voltage drop is about 7.5 V, and the error in voltage measurement itself is 19%. This combined with the system error, using the principle of quadrature, comes out to be about 20%. This error can be reduced by sampling for longer period or by sampling at a higher flow rate. Similarly, at a concentration of 20 mWL, the error is about 7%.

If one wishes to make a short-duration measurement, i.e. less than one day, then it is necessary to allow the tail-end portion of the ionization to be registered by allowing a delay of at least three hours. The correction equation (7) becomes less accurate.

It is possible to increase the sensitivity of the current monitoring device by using an electret of larger thickness. If an approximately 1.524 mm thick electret is used, the sensitivity is increased by a factor of 11. If a short duration sampling is desired at a low concentration, then this electret can be used in the same way as the previous electret. The CF will be 11 times the CF computed by using the equations listed above.

The electret can be used down to a surface voltage of about 150 V. The calibration factor does not hold good thereafter. The upper limit of the surface voltage is about 750 V for a typical embodiment. This leaves headroom of 600 V. Therefore, the E-RPISU goes out of range when the total sample exceeds about 400 mWL. In other words, it is possible to use one electret for about 20 measurements. Variations in the size and operational parameters allow for variations in the number and breadth of possible measurements.

E-RPISU makes an accurate measurement of radon progeny concentration. The monitor units can be designed as a mailable unit similar to other passive monitors such as charcoal detectors or E-PERMS. Electret ion chambers are perform well even at extreme temperatures and humidities encountered in the indoor environment.

The electrets and the measuring device used with standard E-PERM radon monitors are usable with the E-RPISU and hence, at a modest additional cost, it can be a useful addition to the laboratories already using E-PERMS.

Electrets must be handled with some care. Proper airflow calibration has to be ensured, as is the case with other RPISU units. It is generally important to have a correct flow rate. The flowmeter may require periodic calibration checks and filter paper should be changed when necessary. A filter isolates the electret ion chamber from the environmental air. The system can be operated with the top cover closed or with the top cover open. It may be desirable to leave the top cover closed to avoid tampering while running. The reading of the time totalizer is useful in the event of power lost for any reason.

Kotrappa et al. have described how electret devices can be used to measure both radon and thoron progeny concentrations. That methodology is equally applicable to the present invention.

While the invention has been described with reference to specific embodiments, modifications and variations of the invention may be constructed without departing from the scope of the invention, which is defined in the following claims.

TABLE 1

E-RIPSU Results of a Single Blind Test

| Detector Number | Measured Value (MI) | Target Value (TI) | Absolute Value of Relative Error [(MI-TI)/TI] |
|---|---|---|---|
| 1 | 0.029 | 0.031 | 0.065 |
| 2 | 0.031 | 0.031 | 0.000 |
| 3 | 0.000 | 0.000 | Blank |
| 4 | 0.033 | 0.034 | 0.029 |
| 5 | 0.031 | 0.034 | 0.088 |
|   |       |       | Mean = 0.0455 |
| 6 | 0.030 | 0.031 | 0.032 |
| 7 | 0.045 | 0.047 | 0.043 |
| 8 | 0.049 | 0.044 | 0.114 |
| 9 | 0.000 | 0.000 | Blank |
|   |       |       | Mean = 0.063 |

TABLE 1

E-RIPSU Results of a Further Single Blind Test

| Detector Number | Measured Value (MI) | Target Value (TI) | Absolute Value of Relative Error [(MI-TI)/TI] |
|---|---|---|---|
| 1 | 0.136 | 0.137 | 0.007 |
| 2 | 0.144 | 0.137 | 0.051 |
| 3 | 0.135 | 0.137 | 0.015 |
| 4 | 0.134 | 0.137 | 0.021 |
|   |       |       | Mean = 0.024 |

The invention claimed is:

1. A method of monitoring radon progeny concentrations comprising:
   providing a chamber,
   providing a filter holder on one side of the chamber,
   providing a filter in the filter holder,
   providing a pump attached to the filter holder,
   providing a flow meter for measuring airflow through the filter,
   providing one or more air inlets to the filter holder,
   providing an electret in the chamber,
   providing a membrane between the filter holder and the chamber,
   measuring the initial surface voltage of the electret,
   exposing the electret,
   sampling environmental air into the one or more air inlets, through the filter and out an air vent, collecting radon progeny on the filter for a predetermined time,
stopping the pump,
allowing alpha radiation to pass through the membrane but not allowing environmental air to pass,
sealing the electret,
measuring the final surface voltage of the electret,
calculating the radon progeny concentration.

2. The method of claim 1, further comprising juxtaposing an electret voltmeter with a base of the chamber and in situ measuring surface voltage drop of the electret between the initial and the final electret surface voltages.

3. The method of claim 2, further comprising measuring time integrated progeny concentration, wherein the electret surface voltage drop is proportional to the time integrated progeny concentration.

4. The method of claim 1, wherein the surface area of the filter is not limited by the size of detectors.

5. The method of claim 4, further comprising providing the surface area on the filter of approximately 3.5 cm$^2$.

6. The method of claim 1, further comprising providing a chamber which is larger in each dimension than the filter holder.

7. The method of claim 6, further comprising providing the chamber size of approximately 220 ml.

8. The method of claim 1, wherein the providing the pump comprises providing a low flow rate air-sampling pump, wherein the air flow is less than 2.0 liters Per minute.

9. The method of claim 1, wherein the providing the electret comprises providing the electret of between about 0.127 mm and 1.514 mm thick.

10. The method of claim 1, wherein the monitoring operates in a wide variety of atmospheric conditions during a short period of sampling.

11. The method of claim 1, further comprising orienting the filter for exposing radiation from the collected progeny to the interior of the chamber.

12. The method of claim 1, further comprising collecting radon progeny on the filter.

13. The method of claim 1, further comprising collecting unattached radon daughter products on a screen.

14. The method of claim 1, further comprising measuring total radon and radon progeny and unattached daughter products separately.

15. The method of claim 1, further comprising calculating the equilibrium ratio of progeny and unattached daughter products.

16. The method of claim 1, further comprising providing a screw cap connected to an electret cover for sealing the electret.

17. The method of claim 16, further comprising spring loading the cap.

18. The method of claim 1, wherein the collecting radon progeny from fraction of a day to about seven days.

19. The method of claim 1, wherein the monitoring device connects to an exterior power supply.

20. The method of claim 1, further comprising noting the flow rate, start time and stop time.

21. The method of claim 1, wherein the initial and final measurements of electret surface charge are done in the laboratory or in the field.

22. An electret radon progeny integrating sampling unit comprising:
an electret ion chamber,
a filter holder on one side of the chamber,
one or more air inlets in the filter holder,
a filter in the filter holder,
a low flow rate air-sampling pump, wherein the air flow is less than 2.0 liters per minute, attached to the filter holder for pumping environmental air into the one or more air inlets, through the filter or through screen and out an air vent,
a flow meter for measuring airflow through the filter,
an electret in the bottom of the chamber,
a membrane between the filter holder and the chamber for allowing alpha particles to pass through but preventing environmental air from passing,
a electret voltmeter for measuring the initial and final surface voltage of the electret,
an electret cover for exposing and isolating the electret by moving the cover in the chamber, and
an electrical connection to the pump and to a power supply.

23. The apparatus of claim 22, wherein radon progeny are collected on the filter or screen for a predetermined amount of time.

24. The apparatus of claim 22, wherein the radon progeny concentration is calculated from the initial and final electret surface voltage, the time of sampling and the air flow rate.

25. The apparatus of claim 22, wherein the electret surface voltage drop is proportional to the time integrated progeny concentration.

26. The apparatus of claim 22, wherein the filter area is not limited by the size of detectors.

27. The apparatus of claim 26, wherein the filter is approximately 3.5 cm$^2$.

28. The apparatus of claim 22, wherein the chamber is larger in each dimension than the filter holder.

29. The apparatus of claim 28, wherein the chamber is approximately 220 ml.

30. The apparatus of claim 22, wherein the electret is approximately 0.127 mm thick or 1.524 mm thick.

31. The apparatus of claim 22, wherein the monitor is operable in a wide variety of atmospheric conditions during a short period of sampling.

32. The apparatus of claim 22, wherein the filter is oriented in the filter holder for exposing the collected progeny to the interior of the chamber.

33. The apparatus of claim 22, wherein radon progeny are collected on the filter.

34. The apparatus of claim 22, wherein the filter is configured for collecting unattached radon daughter products on a screen in the filter housing.

35. The apparatus of claim 22, wherein total radon and radon progeny and unattached progeny are measured separately.

36. The apparatus of claim 22, wherein the equilibrium ratio of progeny and unattached daughter products is calculated.

37. The apparatus of claim 22, wherein the cap is spring-loaded.

38. The apparatus of claim 22, wherein radon is collected from a fraction of a day to about seven days.

39. Radon progeny monitor apparatus, comprising:
a chamber,
an electret positioned in the chamber,
a cover within the chamber for selectively covering and uncovering the electret,
a filter holder connected to the chamber,
a filter mounted in the filter holder,
one or more air inlets in the filter holder,
an exhaust connected to the filter holder, a pump connected to the filter holder for flowing air into the filter holder through the air inlets, through the filter and out through the exhaust, and a membrane permeable to alpha particles and impermeable to air mounted between the chamber and the filter holder for admitting alpha particles from the filter holder into the chamber.

40. The apparatus of claim 39, wherein the filter traps and holds radon progeny, which decay and emit alpha particles that pass through the membrane into the chamber.

41. The apparatus of claim 40, further comprising gas within the chamber, whereby the alpha particles passing through the membrane ionize the gas, creating ions in the chamber.

42. The apparatus of claim 41, wherein the electret is charged, and the ions within the chamber are attracted to and impinge upon the electret, reducing its charge by a measurable amount which is directly related to the ions in the chamber, to the alpha particles passing through the membrane, which are related to the decay of the radon progeny, to the amount of radon progeny and to the amount of radon in the air flowing into the filter holder and through the filter holder and the filter.

43. The apparatus of claim 22, wherein the electret is not in the immediate vicinity of the filter and therefore is not within the range of alpha radiation.

* * * * *